(12) United States Patent
Kim et al.

(10) Patent No.: US 12,498,767 B2
(45) Date of Patent: Dec. 16, 2025

(54) PORTABLE ELECTRONIC DEVICE COMPRISING HINGE MODULE

(71) Applicant: LG ELECTRONICS INC., Seoul (KR)

(72) Inventors: Philsang Kim, Seoul (KR); Byeongduk An, Seoul (KR); Laio Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 18/290,402

(22) PCT Filed: May 17, 2022

(86) PCT No.: PCT/KR2022/007030
§ 371 (c)(1),
(2) Date: Nov. 13, 2023

(87) PCT Pub. No.: WO2022/245095
PCT Pub. Date: Nov. 24, 2022

(65) Prior Publication Data
US 2024/0264640 A1     Aug. 8, 2024

(30) Foreign Application Priority Data

May 21, 2021   (KR) .................. 10-2021-0065791

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC .............................. G06F 1/1681; G06F 1/1616
See application file for complete search history.

(56) References Cited

U.S. PATENT DOCUMENTS

| 2011/0304983 A1* | 12/2011 | Senatori | G06F 1/1616 |
| | | | 361/679.01 |
| 2013/0308262 A1* | 11/2013 | Chang | H05K 5/0226 |
| | | | 361/679.01 |

(Continued)

FOREIGN PATENT DOCUMENTS

| JP | 3093118 | 4/2003 |
| JP | 3105039 | 10/2004 |

(Continued)

OTHER PUBLICATIONS

PCT International Application No. PCT/KR2022/007030, International Search Report dated Sep. 7, 2022, 15 pages.

*Primary Examiner* — Anthony Q Edwards
(74) *Attorney, Agent, or Firm* — LEE, HONG, DEGERMAN, KANG & WAIMEY

(57) ABSTRACT

A portable electronic device comprises: a first body including an opening formed in the side surface in a first direction; a hinge module comprising a first bracket fixed to the first body and a second bracket coupled to be rotatable about a hinge shaft; and a second body which has one end portion inserted in the opening and is coupled to the second bracket of the hinge module, wherein the hinge shaft is located inside of the first body and is extended in a second direction perpendicular to the first direction. The upper end portion of the opening is located in the first direction as compared with the hinge shaft of the hinge module. In the portable electronic device, the distance between a pair of bodies may be reduced, and thus, a portion between the bodies, in particular, the opening in which the hinge module is extended is invisible from the field of view of a user.

12 Claims, 14 Drawing Sheets

(56) References Cited

U.S. PATENT DOCUMENTS

| | | | | |
|---|---|---|---|---|
| 2018/0059739 A1* | 3/2018 | Chiang | .................. | F16C 11/04 |
| 2019/0171255 A1* | 6/2019 | Cheng | ................. | E05D 11/0054 |
| 2021/0081005 A1* | 3/2021 | Huang | .................. | G06F 1/1618 |
| 2021/0216110 A1* | 7/2021 | Hsu | ....................... | G06F 1/1681 |

FOREIGN PATENT DOCUMENTS

| | | |
|---|---|---|
| JP | 2015049566 | 3/2015 |
| KR | 101091942 | 12/2011 |
| KR | 101209317 | 12/2012 |

* cited by examiner (a)

(b)

(a)

(b)

(a)

(b)

(a)

(b)

(a)

(b)

(a)

(b)

(a)

(b)

(a)

(b)

(a)

(b)

PORTABLE ELECTRONIC DEVICE COMPRISING HINGE MODULE

CROSS-REFERENCE TO RELATED APPLICATIONS

This application is the National Stage filing under 35 U.S.C. 371 of International Application No. PCT/KR2022/007030, filed on May 17, 2022, which claims the benefit of earlier filing date and right of priority to Korean Application No. 10-2021-0065791, filed on May 21, 2021, the contents of which are all hereby incorporated by reference herein their entirety.

TECHNICAL FIELD

The present disclosure relates to a portable electronic device having a hinge module that may reduce a gap between a pair of bodies connected to each other by a hinge and reduce a size of the bodies.

BACKGROUND

A portable electronic device is becoming commonplace in modern society because it may be easily carried by anyone and may be used freely anywhere, and types thereof are diversifying. The portable electronic device may include a portable computer including a laptop PC, a palmtop PCs, or a PDA, a mobile communication device, a game console, an audio or video player (an MP3 player and a portable media player (PMP)), and the like.

Such portable electronic device may include a display device to provide visual information or various user interfaces. When a multimedia function is a main function, a size of a display may be maximized and a user input may be received using a keypad or an interface output on the display. When an input function such as a document creation function is important, a separate user input device may be disposed to increase input convenience.

As the portable electronic device diversifies in functions and a frequency of use thereof increases, a foldable electronic device that is in a foldable form to expand an actual usable area size in a limited size is widely used.

As a representative example, the portable computer referred to as the laptop may be mentioned, and in addition, an electronic device having the display on each of both sides is also commercialized and used.

A form that has two bodies and is folded when carried and unfolded during use as such is classified into a foldable or clamshell form, and has a hinge such that an angle of the two bodies may be freely adjusted.

Durability is important for the hinge that repeatedly changes the angle, and at the same time, a hinge structure that does not increase a volume of the portable electronic device is important because the hinge is used in the portable electronic device.

SUMMARY

Technical Problem

The present disclosure is to provide a portable electronic device equipped with a hinge module that may reduce a size and reduce a gap between a pair of bodies.

Technical Solutions

Provided is a portable electronic device including a first body including an opening defined in a side surface in a first direction thereof, a hinge module including a first bracket fixed to the first body and a second bracket coupled to be pivotable about a hinge shaft, and a second body having one end inserted into the opening, wherein the second body is coupled to the second bracket of the hinge module, wherein the hinge shaft is located inside the first body and extends in a second direction perpendicular to the first direction, wherein an upper end of the opening is more biased in the first direction than the hinge shaft of the hinge module.

The side surface in the first direction may include an upper side surface bent at an end of a top surface of the first body, and
 a lower side surface bent from the upper side surface toward a bottom surface of the first body, and a boundary between the top surface and the upper side surface may be aligned with the upper end of the opening.

The first bracket may include a cylindrical first shaft member constituting the hinge shaft, and
 a first fastening portion extending from the first shaft member and fastened to the first body with a screw, the second bracket may include a second shaft member inserted into the first shaft member, a second fastening portion fastened to the second body with a screw, and a connecting portion extending outwardly from the second shaft member and connected to the second fastening portion, and the connecting portion may include a curved surface or a bent portion to have a C-shape.

The second shaft member may include a first portion overlapping the first shaft member, and a second portion where the connecting portion extends, and the first portion and the second portion may be disposed side by side in the second direction.

An insertion direction of the screw inserted into the second fastening portion may overlap the hinge shaft.

The first portion of the second shaft member may be a cylindrical member, and the second portion of the second shaft member may include a plate-shaped member extending from one side of the first portion.

The second shaft member may further include a cylindrical third portion located at an end of the second portion.

The first fastening portion and the second fastening portion may be disposed in parallel with each other when the first body overlaps the second body.

An angle between the top surface and the upper side surface may be equal to or smaller than 120°.

A horizontal distance from a first boundary between the top surface and the upper side surface to a second boundary between the upper side surface and the lower side surface may be equal to or smaller than 3 mm.

The first body may be equipped with a keyboard, and the second body may be equipped with a display.

A thickness of the second body may be smaller than a thickness of the first body.

Advantageous Effects

According to at least one embodiment of the present disclosure, the gap between the pair of bodies may be reduced, so that the opening that is defined between the bodies, and especially, is the portion in which the hinge module extends is not noticeable in the line of sight of the user.

In addition, because the size of the hinge module may be reduced, the size of the portable electronic device may be reduced.

In addition, because the area size for mounting the display may be secured, the larger screen may be mounted.

Effects that may be obtained from the present disclosure are not limited to the effects mentioned above, and other effects not mentioned will be clearly understood by those skilled in the art from the description below.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, and the like.

Figure 1:
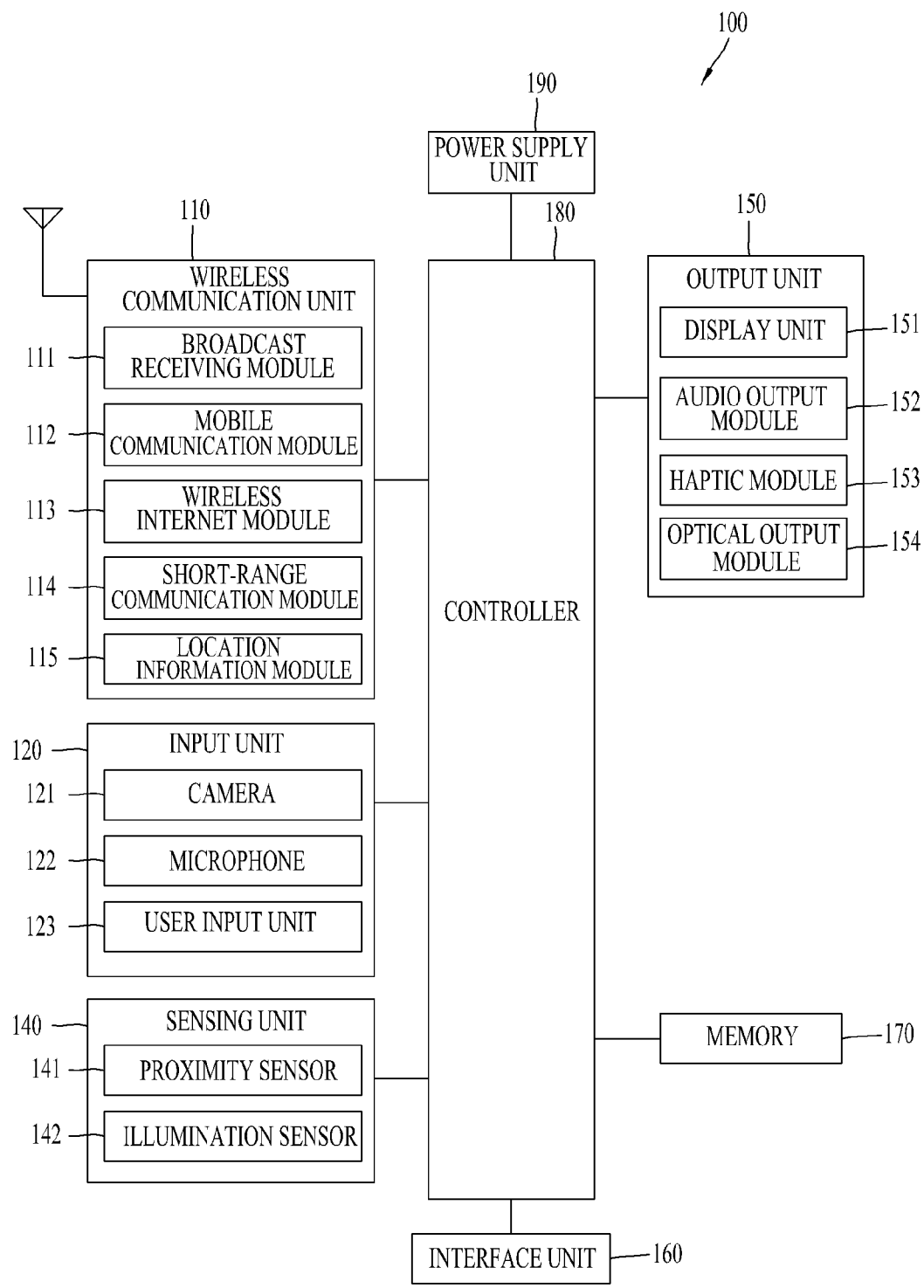
FIG. 1 is a block diagram of a portable electronic device in accordance with the present disclosure.

FIG. 1 is a block diagram of a portable electronic device in accordance with the present disclosure The portable electronic device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the portable electronic device 100 and a wireless communication system, communications between the portable electronic device 100 and another portable electronic device, communications between the portable electronic device 100 and an external server. Further, the wireless communication unit 110 typically includes one or more modules which connect the portable electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

The sensing unit 140 is typically implemented using one or more sensors configured to sense internal information of the portable electronic device, the surrounding environment of the portable electronic device, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The portable electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the portable electronic device 100 and a user, as well as function as the user input unit 123 which provides an input interface between the portable electronic device 100 and the user.

The interface unit 160 serves as an interface with various types of external devices that can be coupled to the portable electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 may perform assorted control functions associated with a connected external device, in response to the external device being connected to the interface unit 160.

The memory 170 is typically implemented to store data to support various functions or features of the portable electronic device 100. For instance, the memory 170 may be configured to store application programs executed in the portable electronic device 100, data or instructions for operations of the portable electronic device 100, and the like. Some of these application programs may be downloaded from an external server via wireless communication. Other application programs may be installed within the portable electronic device 100 at time of manufacturing or shipping, which is typically the case for basic functions of the portable electronic device 100 (for example, receiving a call, placing a call, receiving a message, sending a message, and the like). It is common for application programs to be stored in the memory 170, installed in the portable electronic device 100, and executed by the controller 180 to perform an operation (or function) for the portable electronic device 100.

The controller 180 typically functions to control overall operation of the portable electronic device 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the portable electronic device 100 to drive the application programs.

The power supply unit 190 can be configured to receive external power or provide internal power in order to supply appropriate power required for operating elements and components included in the portable electronic device 100. The power supply unit 190 may include a battery, and the battery may be configured to be embedded in the terminal body, or configured to be detachable from the terminal body.

Some or more of the components may be operated cooperatively to embody an operation, control or a control method of the portable electronic device in accordance with embodiments of the present disclosure. Also, the operation, control or control method of the portable electronic device may be realized on the portable electronic device by driving of one or more application problems stored in the memory 170.

Figure 2:
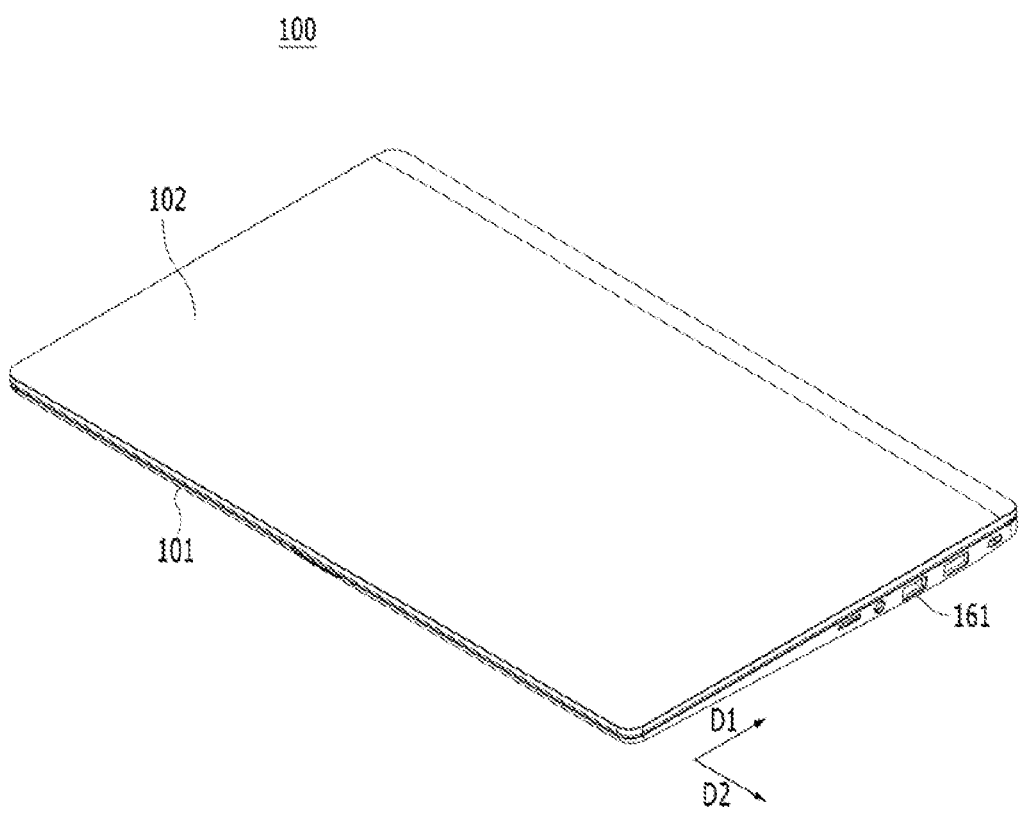
FIG. 2 is a perspective view showing a closed state of a portable electronic device according to one aspect of the present disclosure.
Figure 3:
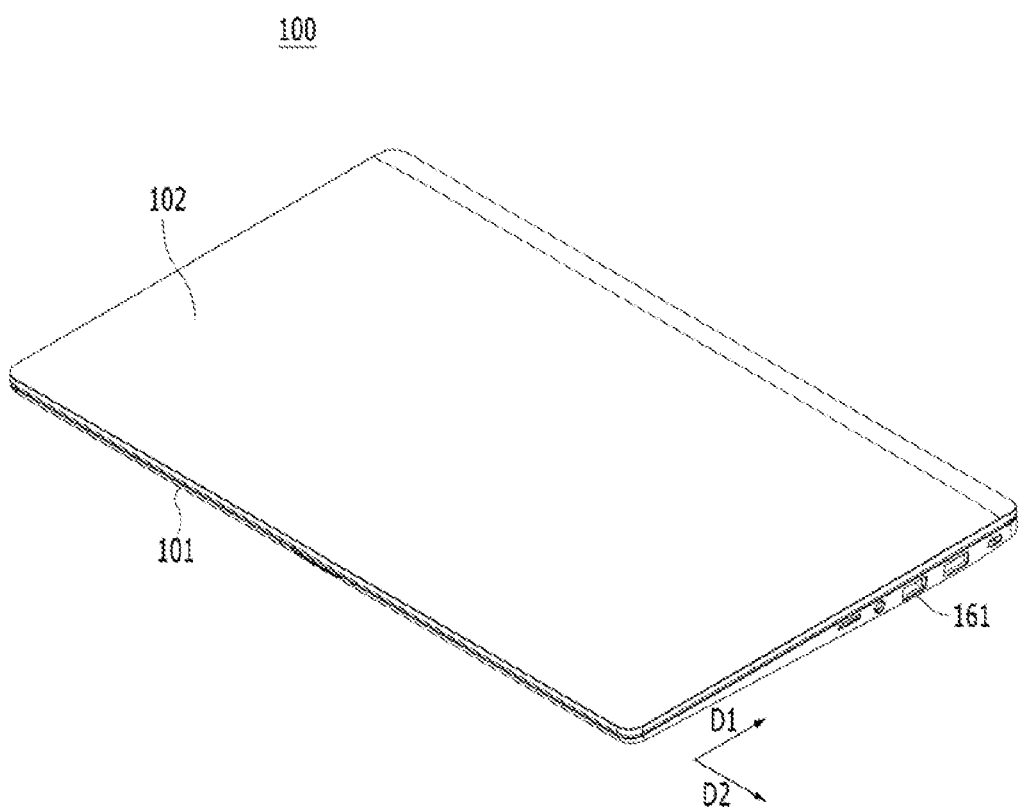
FIG. 3 is a perspective view showing an open state of a portable electronic device shown in FIG. 2.

FIG. 2 is a perspective view showing a closed state of the portable electronic device 100 according to one aspect of the present disclosure, and FIG. 3 is a perspective view showing an open state of the portable electronic device 100 shown in FIG. 2.

The portable electronic device 100 according to the present disclosure is composed of a pair of bodies 101 and 102, and the first body 101 and the second body 102 are coupled to each other to pivot via a hinge module 130. That is, the hinge module 130 varies an angle between the first body 101 and the second body 102. The closed state in which the second body 102 overlaps on a top surface of the first body 101 as shown in FIG. 2 may be switched to the open state as the angle between the first body 101 and the second body 102 is widened.

An unfolded state in FIG. 3 is a use state. In this state, the angle of the second body 102 may be fixed to an angle desired by a user, and a surface on which a display of the second body 102 is positioned may be disposed in a vertical direction to a line of sight of the user.

Because the first body 101 is used by being placed on a mounting surface, a surface of the first body 101 that overlaps the second body 102 in the closed state will be referred to as the top surface and an opposite surface thereof that is mounted on the floor will be referred to as a bottom surface. Because locations of top and bottom are changed as the second body 102 pivots, a surface of the second body 102 that overlaps the first body 101 will be referred to as a first surface, and an opposite surface thereof will be referred to as a second surface.

The first body 101 may include a main board and an electronic chip such as a CPU mounted on the main board as a controller, and may include an input device 123 on the top surface thereof. The input device may include a keypad 123*a* having a plurality of keys, a touchpad 123*b* for a touch input, and the like. Apart from the keypad 123*a*, a power button 123*c*, a volume button, a reset button, and the like may be additionally disposed on the top surface, side surfaces, or the bottom surface of the first body 101.

On the side surface of the first body 101, an interface 161, such as a power input terminal, an HDMI cable terminal, a USB port, and an ear jack, that may receive power or may be connected to an external device and transmit and receive data may be disposed.

The second body 102 may include a display 151. The display 151 may be implemented by a liquid crystal display (LCD), a thin film transistor liquid crystal display (TFT LCD), an organic light-emitting diode (OLED), a flexible display, a three-dimensional display (3D display), and the like.

A camera 121 that may capture a subject may be disposed on an upper bezel of the display 151. The camera 121 may capture the user and may be used for a video call, a video conference, and the like. A capturing angle may be adjusted by adjusting the angle of the second body 102.

The hinge module 130 connecting the first body 101 and the second body 102 requires durability such that the pivoting motion occurs stably, and at the same time, requires a small size because of being mounted on the portable electronic device 100.

The hinge module 130 may be located at an end in a first direction D1 of the first body 101, and an opening may be defined at a side surface in the first direction of the first body 101 such that a portion of the hinge module 130 may extend. Hereinafter, the side surface in the first direction on which the hinge module 130 is located will be referred to as a hinge side surface 1013.

The hinge module 130 may be generally composed of a hinge shaft 135 and a pair of brackets (a first bracket 131 and a second bracket 132) coupled to the hinge shaft 135 to be pivotable about the same, and the first body 101 and the second body 102 may be respectively coupled to the pair of brackets.

Figure 4:
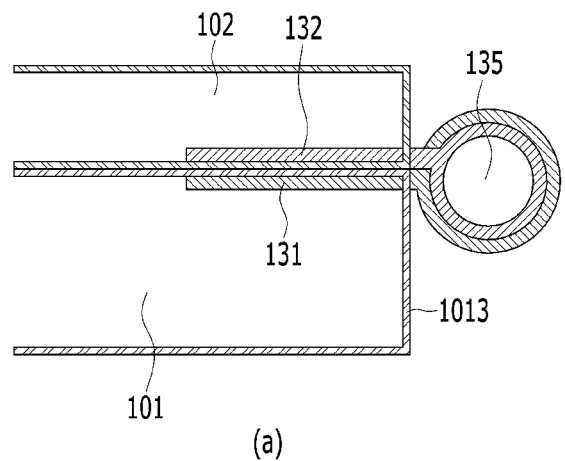
FIGS. 4 to 6 are conceptual views showing a closed state and an open state according to various embodiments of a hinge module.
Figure 4:
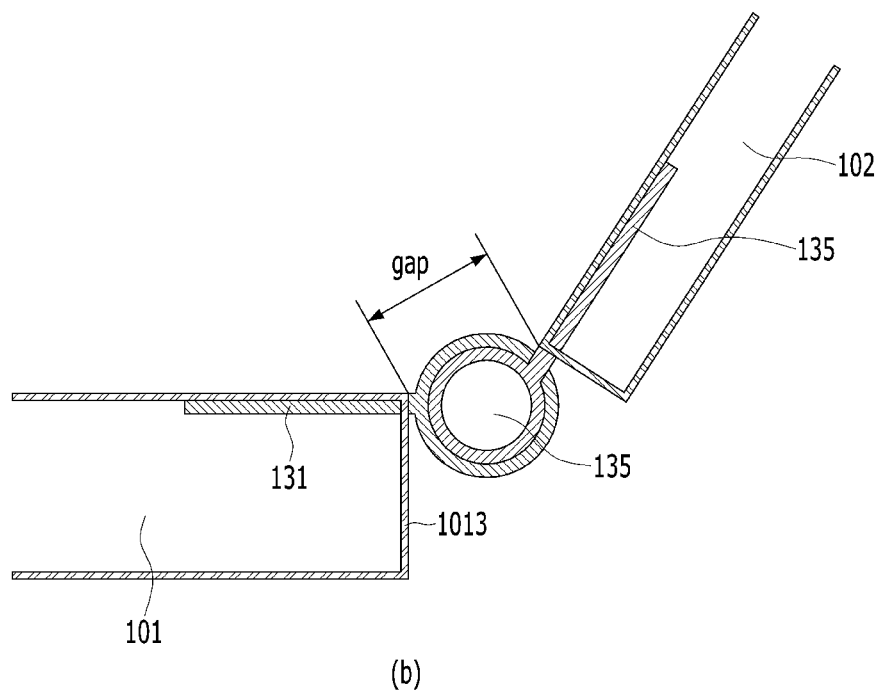
Figure 5:
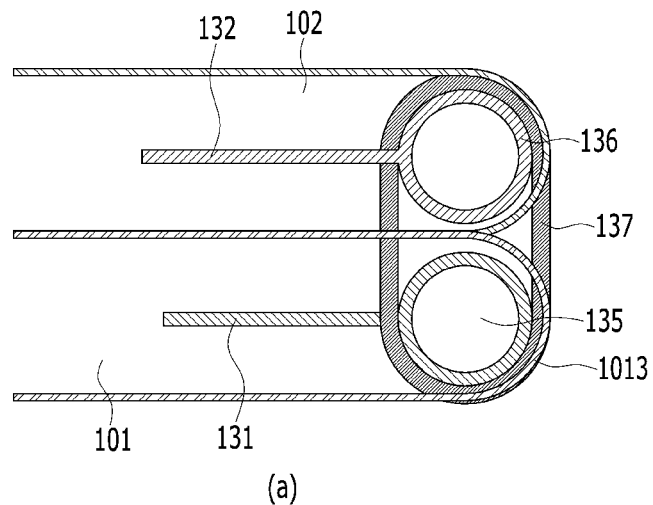
Figure 5:
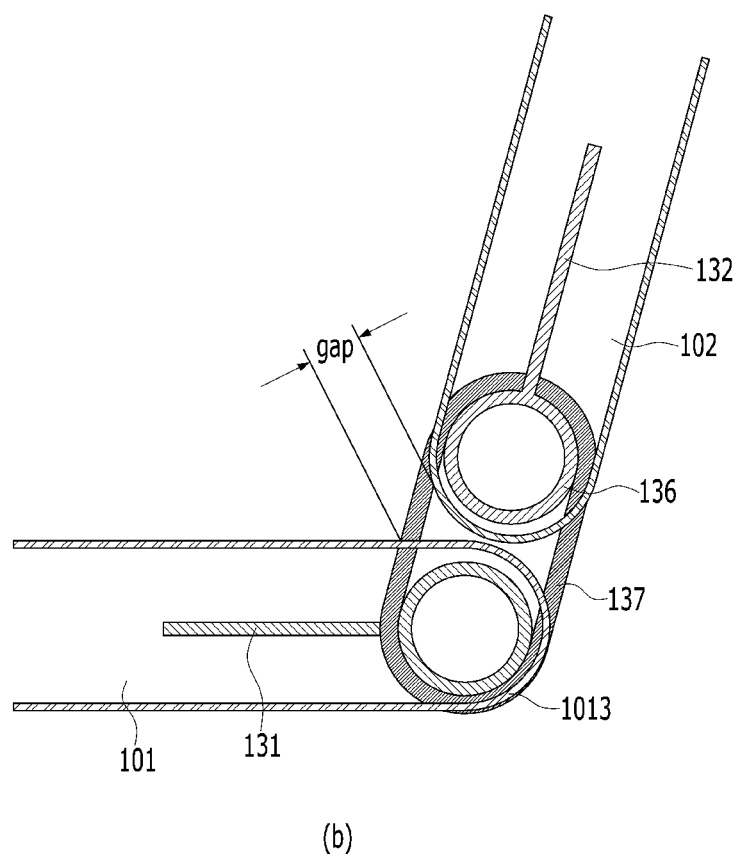
Figure 6:
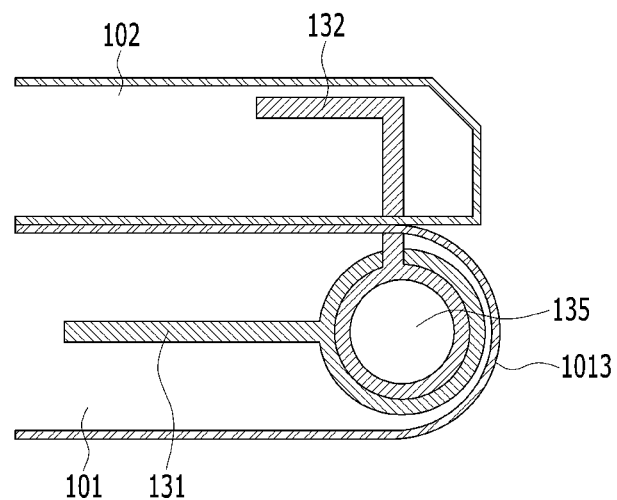
Figure 6:
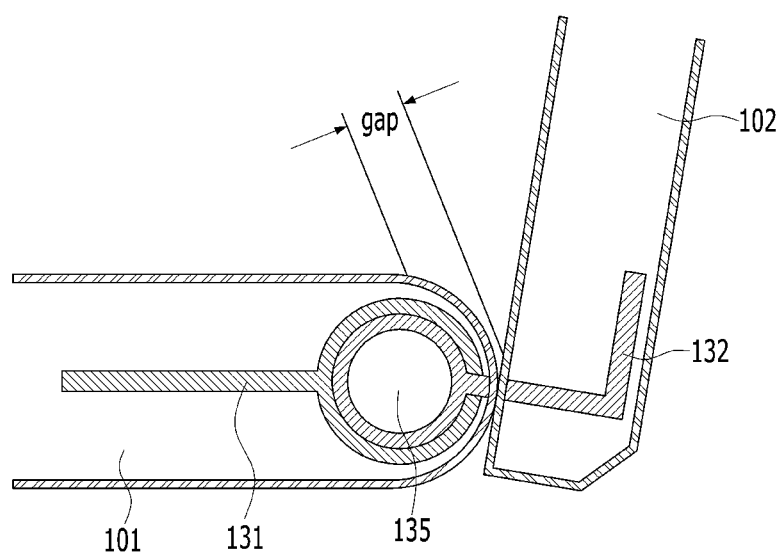

Depending on a shape of the hinge module 130, a location of the second body 102 may vary in the open state. FIGS. 4 to 6 are conceptual views showing a closed state and an open state according to various embodiments of the hinge module 130.

A form in which the hinge shaft 135 is located outwardly of the pair of bodies according to the embodiment of FIG. 4 is easy to implement, but because the hinge shaft 135 is exposed to the outside, a volume is increased when applied to the portable electronic device 100 and it is not aesthetically pleasing.

In addition, although the pair of bodies may be in close contact with each other in the closed state without a gap between opposite surfaces (the top surface of first body 101 and the first surface of the second body 102), the gap occurs between the pair of bodies when the angle is changed and the closed state is switched to the open state. In particular, as shown in (b) in FIG. 4, there is a problem in that the hinge module 130 is visible between the pair of bodies.

As shown in (b) in FIG. 4, the hinge module 130 supports the second body 102 while the second body 102 is floating in the air in the open state. However, because the hinge shaft 135 is located outwardly of the first body 101, a force of supporting the second body 102 is not directly transmitted to the first body 101, so that there is a problem of weak support.

FIG. 5 is a view showing an embodiment of a double hinge module 130 having a pair of hinge shafts 135. The double hinge module 130 may include the pair of hinge shafts 135 and a hinge housing that connects the hinge shafts 135 to each other.

In the present embodiment, because the hinge shaft 135 is located for each body and the hinge shaft 135 is located inside the second body 102, as shown in (b) in FIG. 5, a motion range of an end of the second body 102 is small when the second body 102 is switched to the open state, so that there is an advantage of less interference with the first body 101.

However, to avoid the interference, the double hinge module 130 also has problems that the pair of bodies need to be spaced apart from each other or curved surfaces need to be formed on respective side surfaces in the first direction of the pair of bodies, and the pair of hinge shafts 135 and the hinge housing that accommodate the pair of hinge shafts 135 therein are needed, causing an increase in a size of the hinge module 130.

In particular, the second body 102 is a portion where the display 151 is disposed and is thinner than the first body 101, so that it is difficult to implement a thin second body 102 when using the double hinge module 130 that dispose the hinge shaft 135 in the second body 102.

FIG. 6 shows an embodiment in which the hinge shaft 135 is located in the first body 101. As shown in (a) in FIG. 6, the second bracket 132 fastened to the second body 102 may have a bent shape to overlap the second body 102.

In this case, the hinge module 130 is not exposed to the outside of the first body 101 and the second body 102, and the second body 102 is not disposed in the floating state apart from the floor surface as in (a) in FIG. 4, so that a more stable arrangement becomes possible.

Because the number of hinge shafts 135 is smaller than that in the embodiment of FIG. 5, a volume of the hinge module 130 is small, so that it is easy to secure a mounting space when such structure is applied to the portable electronic device 100.

As shown in (b) in FIG. 6, the first body 101 may have the curved surface on the hinge side surface 1013 where the hinge module 130 is located such that the second body 102 does not collide with the first body 101 while pivoting to be spaced apart from the first body 101 and switch to the open state, and the gap between the first body 101 and the second body 102 may be visible to the user.

Hereinafter, as shown in FIG. 6, a description will be made based on the hinge shaft 135 located in the first body 101 and the hinge module 130 composed of the first bracket 131 and the bent second bracket 132.

Figure 7:
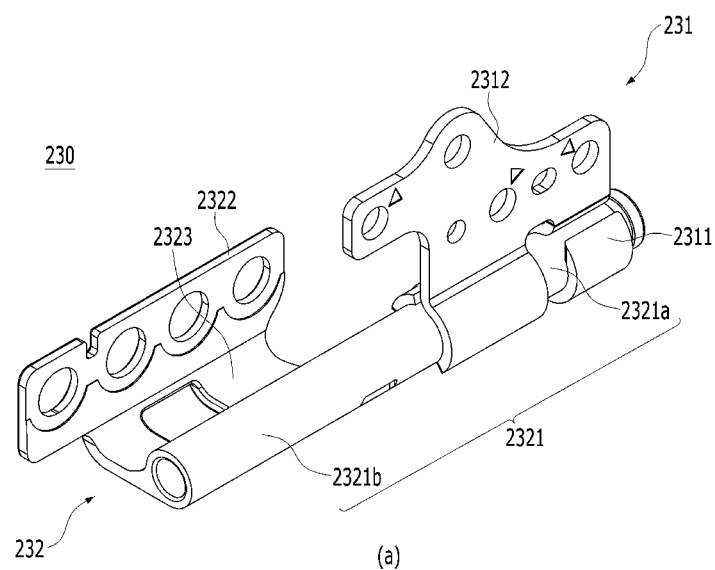
FIG. 7 is a view showing a hinge module actually implementing an embodiment of FIG. 6.
Figure 7:
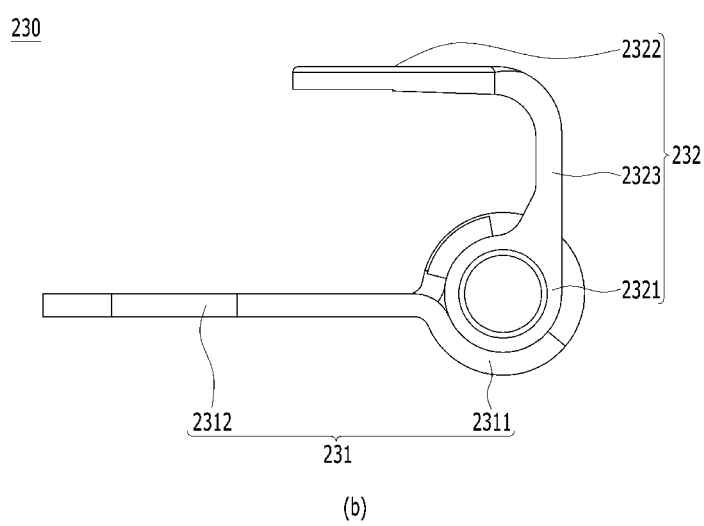

FIG. 7 is a view showing a hinge module 230 actually implementing the embodiment of FIG. 6, where (a) is a perspective view and (b) is a side view.

A first bracket 231 includes a cylindrical first shaft member 2311 constituting a hinge shaft 235, and a first fastening portion 2312 extending from the first shaft member 2311 and fastened to a first body 201. The second bracket 232 includes a second shaft member 2321 overlapping the first shaft member 2311, and a second fastening portion 2322 extending from the second shaft member 2321 and fastened to a second body 202.

The first shaft member 2311 and the second shaft member 2321 have the cylindrical shapes, so that various cables 288 and 388 (see FIG. 14) that connect the first body 201 to the second body 202 may pass through the first shaft member 2311 and the second shaft member 2321 and electrically connect the first body 201 and the second body 202 to each other.

Because the second fastening portion 2322 is located away from the hinge shaft 235, the second fastening portion 2322 may include a connecting portion 2323 that connects the second shaft member 2321 and the second fastening portion 2322 to each other, and as shown in (b) in FIG. 7, the connecting portion 2323 and the second fastening portion 2322 may have an L-shaped bent shape.

The second shaft member 2321 may include a first portion located inside the first shaft member 2311 and a second portion 2321b that extends further from the first shaft member 2311 and does not overlap the first shaft member 2311, and the connecting portion 2323 may be connected to the second portion 2321b. The first portion 2321a and the second portion 2321b may be disposed side by side in a direction of the hinge shaft 235.

Figure 8:
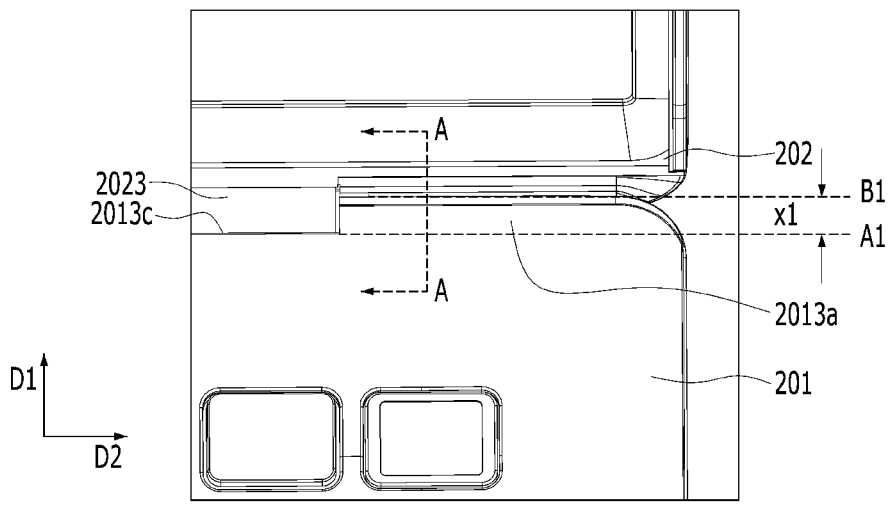
FIG. 8 is a view showing a boundary between a first body equipped with a hinge module in FIG. 7 and a second body of a portable electronic device.
Figure 8:
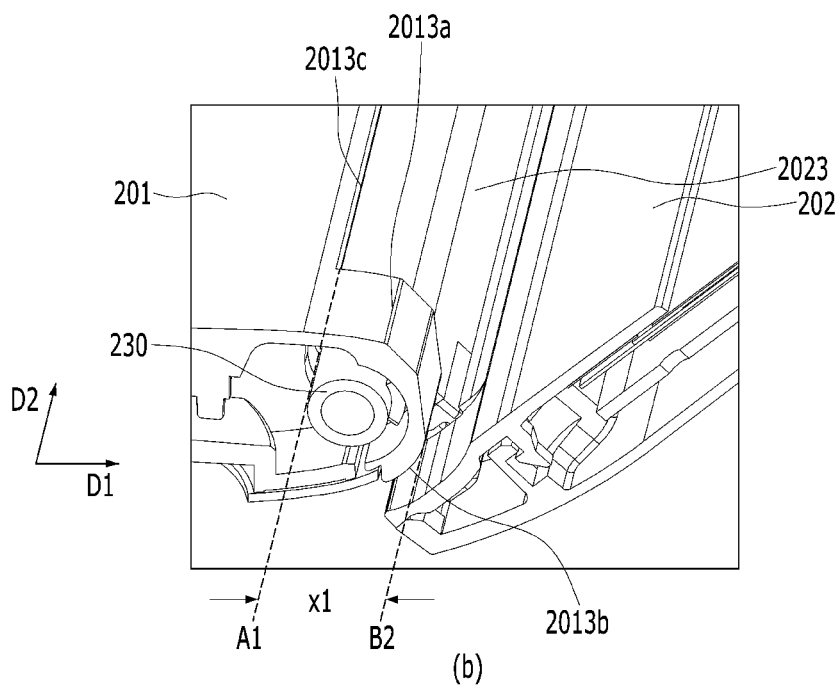

FIG. 8 is a view showing a boundary between the first body 201 equipped with the hinge module 230 in FIG. 7 and the second body 202 of the portable electronic device 100, where (a) is a view of an open state of the second body 202 viewed from above at 90° and (b) is a cross-sectional view taken along a line A-A of (a).

The first body 201 may include an opening 2013*c* in a side surface in the first direction thereof such that the connecting portion 2323 and the second fastening portion 2322 of the second bracket 232 may pass, and the hinge shaft 235 of the hinge module 230 may be located inside the opening 2013*c* to extend in a second direction perpendicular to the first direction.

The connecting portion 2323 and the second fastening portion 2322 may extend from the second shaft member 2321 through the opening 2013*c*, so that the second body 202 and the second fastening portion 2322 may be coupled to each other.

Figure 9:
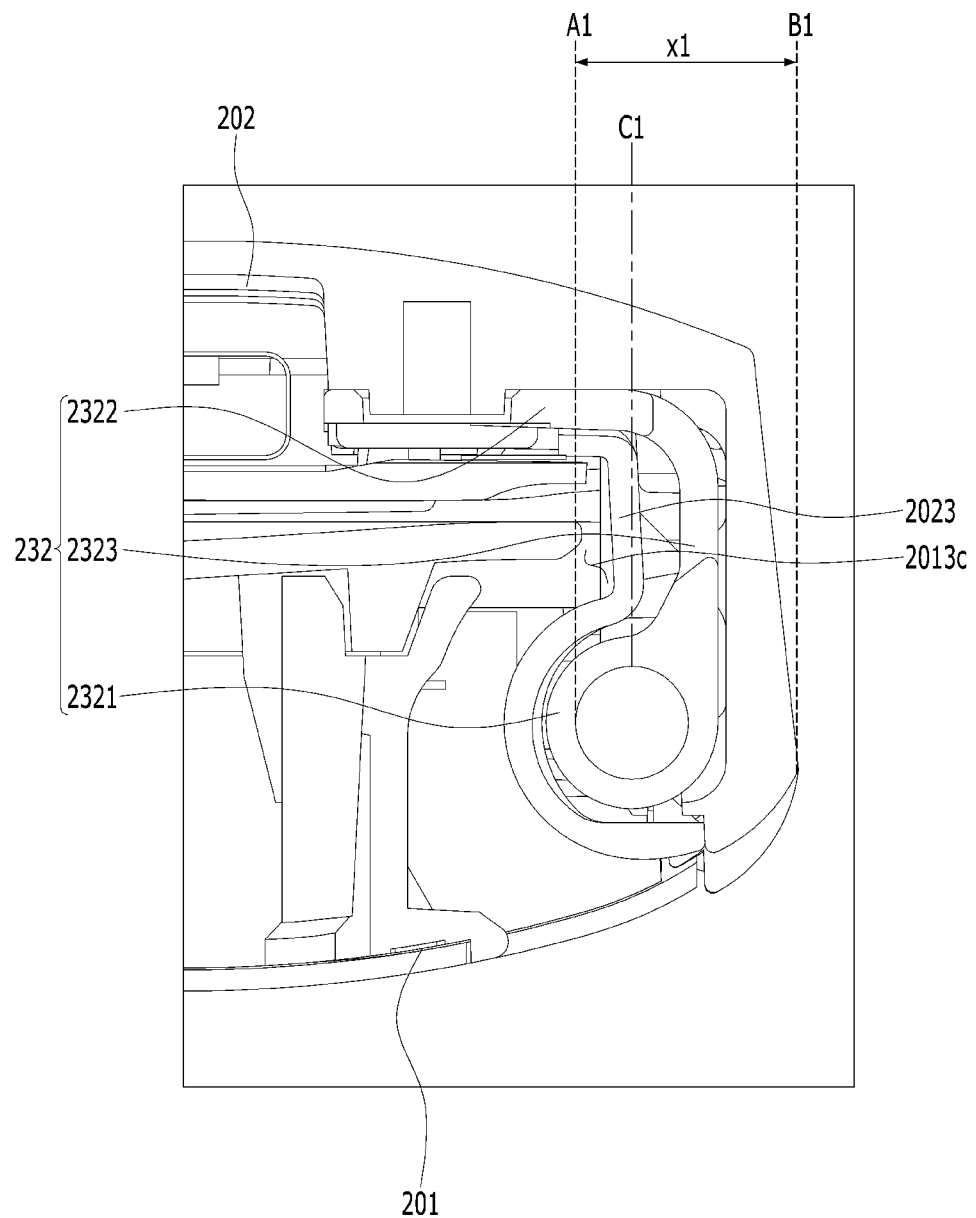
FIG. 9 is a cross-sectional view in a closed state of an embodiment of FIG. 8.

FIG. 9 is a cross-sectional view in a closed state of the embodiment of FIG. 8. In the closed state, the connecting portion 2323 is disposed in a vertical direction and the second fastening portion 2322 is disposed in a horizontal direction.

The connecting portion 2323 passes through the opening 2013*c*, and an upper end of the opening 2013*c* extends to a location where interference with the connecting portion 2323 does not occur in the closed state. A lower end of the opening 2013*c* may be defined to a location where the interference with the connecting portion 2323 does not occur in a state in which the second body 202 is opened while having a maximum angle with the first body 201.

The upper end of the opening 2013*c* forms a line extending in a second direction D2 because the hinge shaft 235 of the hinge module 230 is disposed in the second direction, and the line in the second direction formed by the upper end of the opening 2013*c* is referred to as a first reference line A1.

As shown in FIG. 9, when a hinge cover 2023 that covers the connecting portion 2323 such that the hinge module 230 is not directly exposed via the opening 2013*c* is included, the upper end of the opening 2013*c* may be determined even in consideration of the hinge cover 2023.

A hinge side surface 2013 located in the first direction of the first body 201 may have the opening 2013*c* defined at a location corresponding to the second portion 2321*b* of the second shaft member 2321, and may have a closed form at a location corresponding to a location where the first shaft member 2311 is located.

A portion of the hinge side surface 2013 where the opening 2013*c* is not defined may include a curved surface as shown in (b) in FIG. 8 to avoid interference with the second body 202. The hinge side surface 2013 may have a plurality of bent surfaces or form the curved surface, and may be divided into an upper side surface 2013*a* and a lower side surface 2013*b* based on the most laterally protruding portion B1.

The upper side surface 2013*a* obliquely faces upward and the lower side surface 2013*b* obliquely faces downward. The lower side surface 2013*b* may not be visible to the user, and the upper side surface 2013*a* may be exposed to the user based on a user's gaze angle in the open state.

A size of the upper side surface 2013*a* in the first direction (the vertical direction in (a) in FIG. 8) is a length x1 from the first reference line A1 to a second reference line B1, which is a boundary of the upper side surface 2013*a* that protrude most in the first direction and the lower side surface 2013*b*. The size in the first direction of the upper side surface 2013*a* may correspond to a size of the opening 2013*c* visible to the user.

Even when the hinge cover 2023 prevents the hinge from being exposed, the opening 2013*c* and the upper side surface 2013*a* become design elements that damage continuity between the first body 201 and the second body 202.

To improve the design aspect, the size in the first direction of the upper side surface 2013*a* may be reduced. In particular, a visible area size of the upper side surface 2013*a* may be minimized or, preferably, the upper side surface 2013*a* may be invisible at an angle (60°) that is an angle for the user to view a space between the first body 201 and the second body 202 when using the portable electronic device 100.

When the upper end of the opening 2013*c* is disposed at a location that is more shifted toward the first direction, or when the second reference line B1 is withdrawn in a third direction opposite to the first direction, that is, toward an inner side of the first body 201, the size in the first direction of the upper side surface 2013*a* may be reduced.

However, as described above, because the size in the first direction of the opening 2013*c* is related to the pivoting range of the connecting portion 2323, it is not easy to dispose the first reference line A1 at the location that is more shifted toward the first direction or move the second reference line B1 in the third direction.

Figure 10:
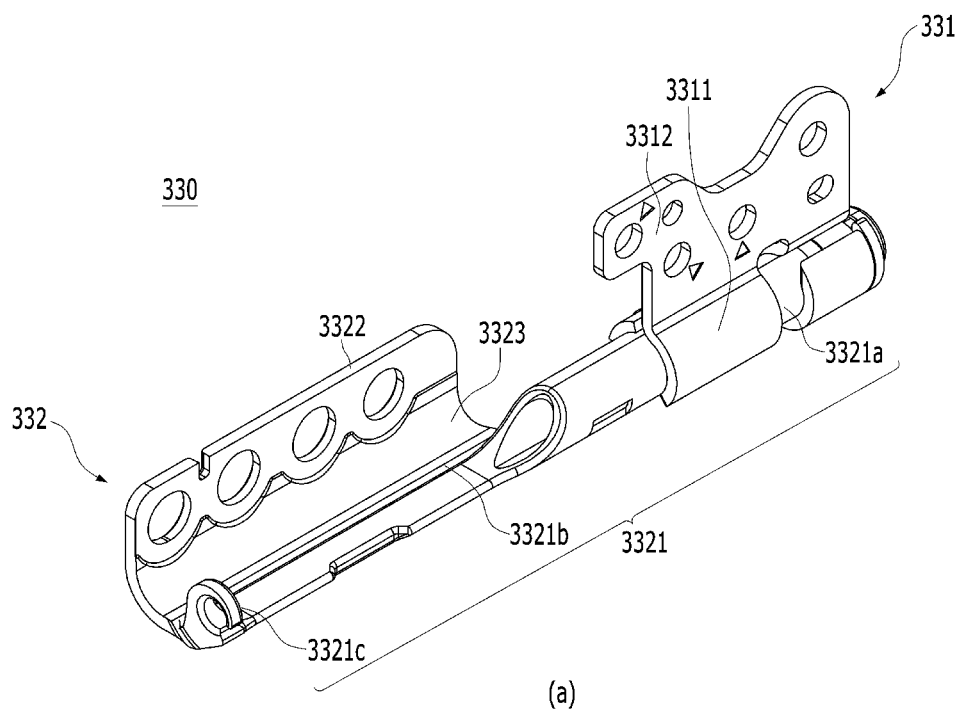
FIG. 10 is a view showing another embodiment of a hinge module according to the present disclosure.
Figure 10:
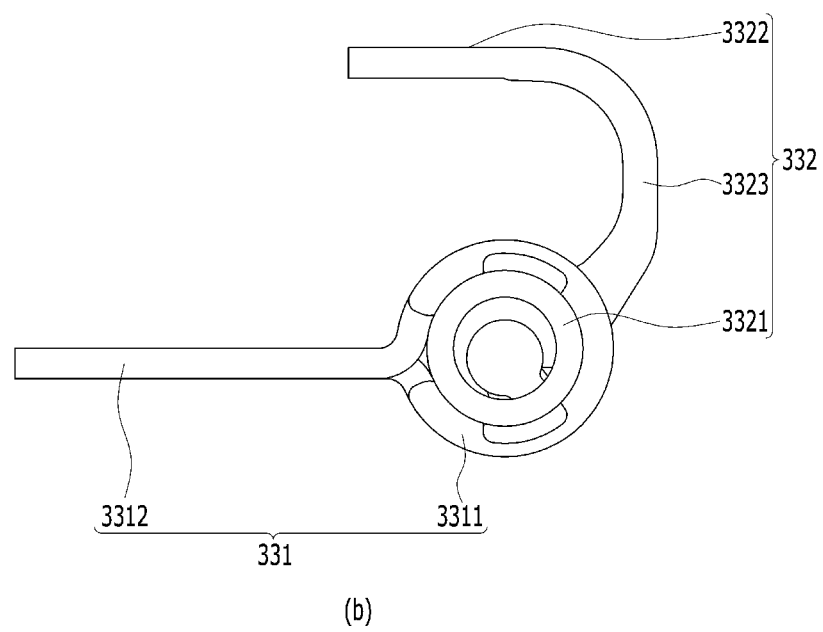

FIG. 10 is a view showing another embodiment of a hinge module 330 according to the present disclosure. (a) in FIG. 10 is a perspective view and (b) in FIG. 10 is a side view: Referring to (b) in FIG. 10, unlike in the embodiment of FIG. 7 described above, a connecting portion 3323 is bent in a C shape.

The connecting portion 3323 in the present embodiment may have a shape bent in the first direction to move a location of an upper end of an opening 3013*c*, that is, the first reference line in the first direction.

As shown in (b) in FIG. 10, when a first bracket 331 and a second bracket 332 are arranged such that a second fastening portion 3322 is arranged parallel to a first fastening portion 3312 (when the portable electronic device 100 is in the closed state), the connecting portion 3323 may not extend vertically from a second shaft member 3321, but may be located to be biased in a rightward direction (the first direction) in the drawing, that is, a direction of an end of a second body 301.

Figure 11:
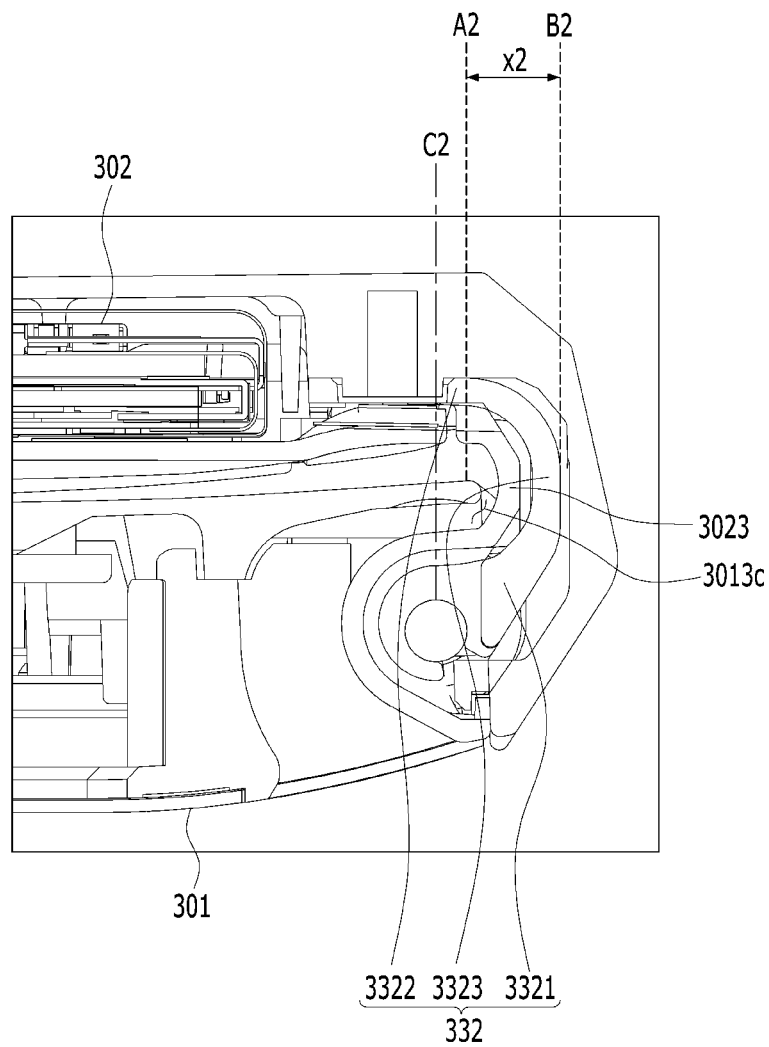
FIG. 11 is a view showing a state in which a hinge module in FIG. 10 is mounted on a first body and a second body.

FIG. 11 is a view showing a state in which the hinge module 330 in FIG. 10 is mounted on the first body 301 and a second body 302. As shown in FIG. 11, when the connecting portion 3323 is bent in the C shape and located in the end direction, the connecting portion 3323 is positioned to be more shifted toward the first direction in a closed state compared to the embodiment in FIG. 7.

Accordingly, the upper end of the opening 3013*c* may also be positioned to be more shifted toward the first direction than in the above-described embodiment of FIG. 9.

Referring to FIG. 9, because a location C1 of the hinge shaft 235 is more biased in the first direction than the first reference line A1, the size x1 in the first direction of the upper side surface 2013*a* increases to cover the shaft member portion of the hinge module 230.

On the other hand, as shown in FIG. 11, when the connecting portion 3323 is bent and a first reference line A2 moves in the first direction, a location of the first reference line A2 may be more biased in the first direction than a location C2 of a hinge shaft 335, and a size x2 in the first direction of an upper side surface 3013*a* may become smaller.

Figure 12:
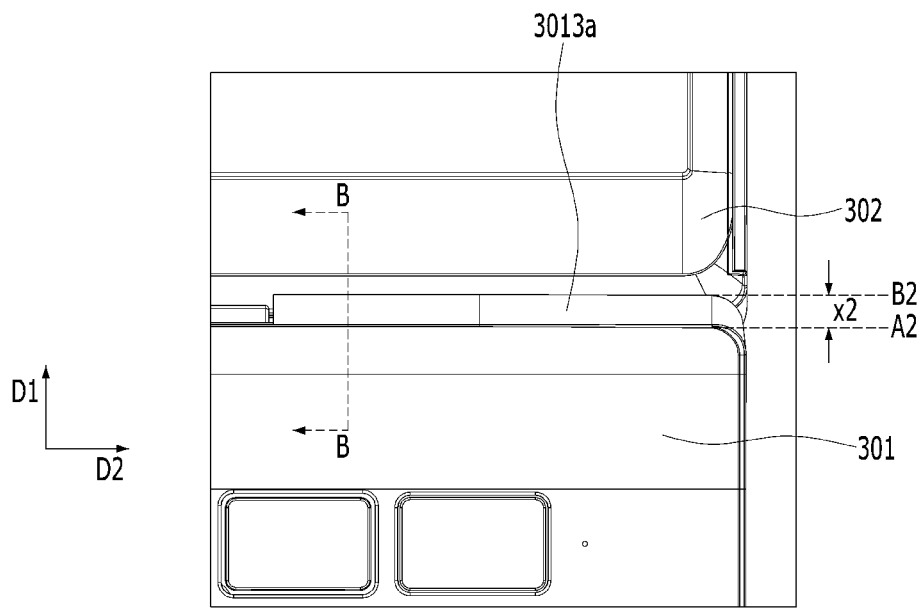
FIG. 12 is a view showing a boundary between a first body and a second body of a portable electronic device in FIG. 10.
Figure 12:
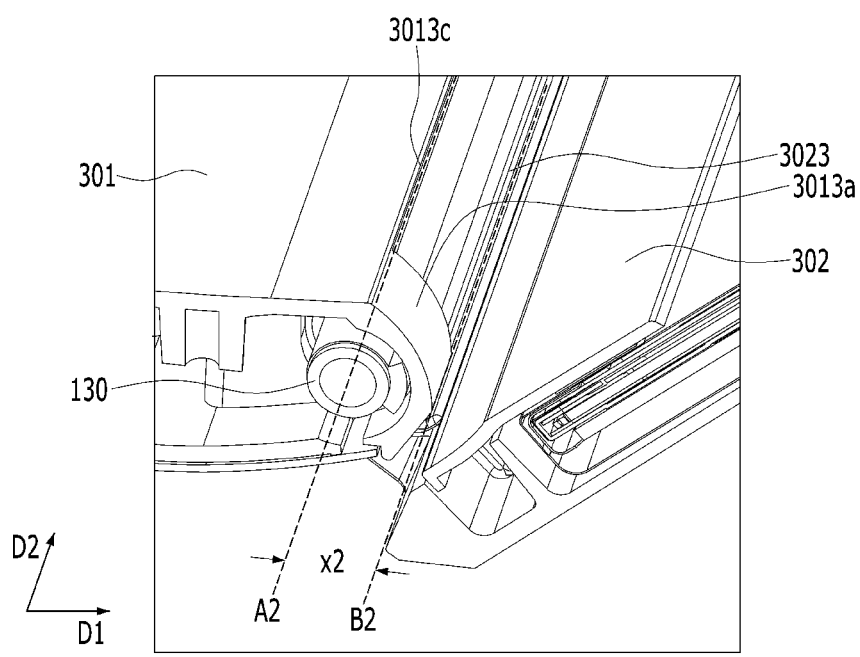

FIG. 12 is a view showing a boundary between the first body 301 and the second body 301 of the portable electronic device 100 in FIG. 10, where (a) is a view of an open state of the second body 301 viewed from above at 90°, and (b) is a B-B cross-sectional view taken along a line B-B in (a).

Because the first reference line A2 is more biased in the first direction than the hinge shaft 335, a length x2 in the first direction between the first reference line A2 and a second reference line B2 is shortened, which means that the length x2 in the first direction of the upper side surface 3013a is shortened. When the length in the first direction of the upper side surface 3013a is shortened, as shown in FIG. 11, an angle of the upper side surface 3013a may be more steep.

Figure 13:
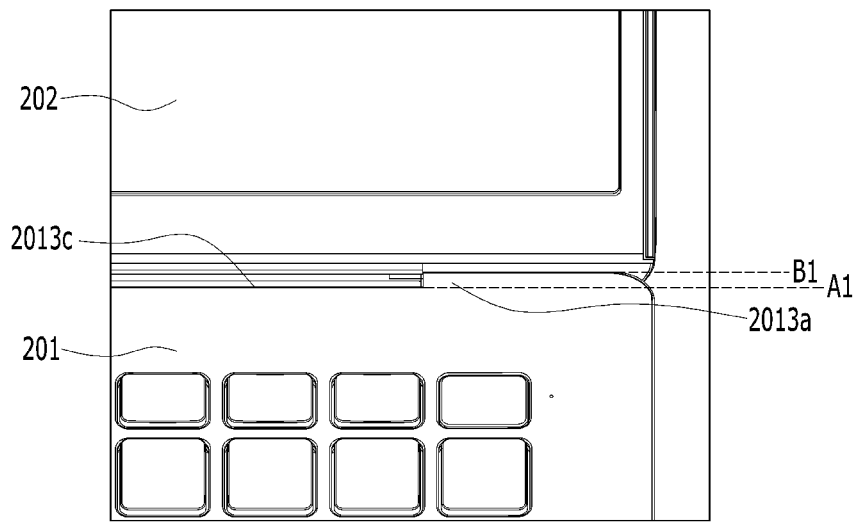
FIG. 13 is a view showing a boundary between a first body and a second body according to an embodiment of FIG. 9 and an embodiment of FIG. 11.
Figure 13:
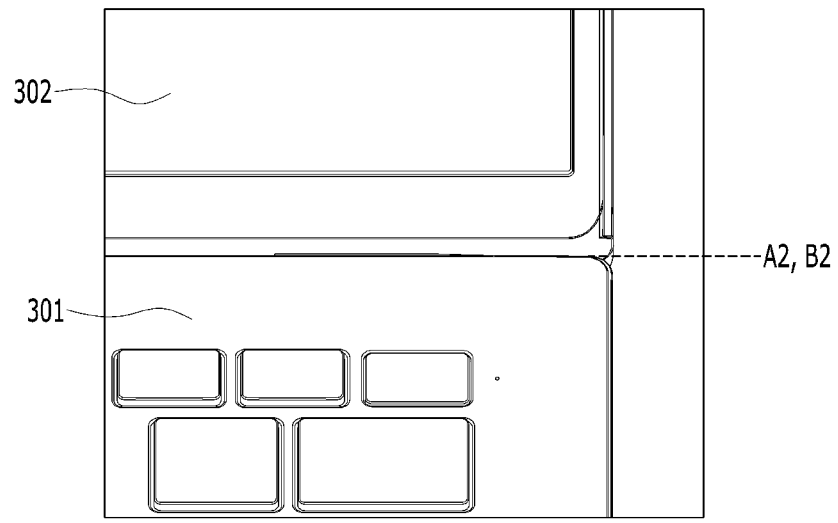

FIG. 13 is a view showing a boundary between the first body 201 and 301 and the second body 202 and 302 according to the embodiment of FIG. 9 and the embodiment of FIG. 11, and is a view viewed at an angle of 60°, which is an angle at which the user looks at the portable electronic device 100 while using the same.

The length of the upper side surface 3013a is consequently related to the angle in a state where a thickness thereof is determined. When the angle of the upper side surface 3013a is steeper than the user's viewing angle (e.g., 60°), the user is not able to recognize the upper side surface 3013a and opening 3013c while using the portable electronic device 100.

In the embodiment of FIG. 9, the upper side surface 2013a has the great length in the first direction and has a gentle slope, so that the upper side surface 2013a and the opening 2013c are visible as shown in (a) in FIG. 13. On the other hand, in the embodiment of FIG. 11, the upper side surface 3013a has the relatively small length in the first direction, and accordingly, has a steep slope, so that the upper side surface 3013a and the opening 3013c are not visible as shown in (b) in FIG. 13.

For the upper side surface 3013a not to be visible to the user, the angle formed by the upper side surface 3013a must be equal to or greater than the viewing angle. Accordingly, according to the embodiment of FIG. 11, an angle between a top surface of the first body 301 and the upper side surface 3013a becomes a viewing angle of +90°. When the user's viewing angle is 60°, the angle between the top surface of the first body 301 and the upper side surface 3013a may be equal to or smaller than 120°.

That is, the boundary between the first body 301 and the second body 302 forms a straight line extending in the second direction, and the opening 3013c recognized as a gap between the first body 301 and the second body 302 is invisible.

In addition, the hinge shaft 335 of the hinge module 330 may be disposed further inside the first body 301, so that the second reference line may also be moved in the third direction while the first reference line moves in the first direction. Because a size in the first direction of the first body 301 may be reduced, the portable electronic device 100 may become more compact.

Figure 14:
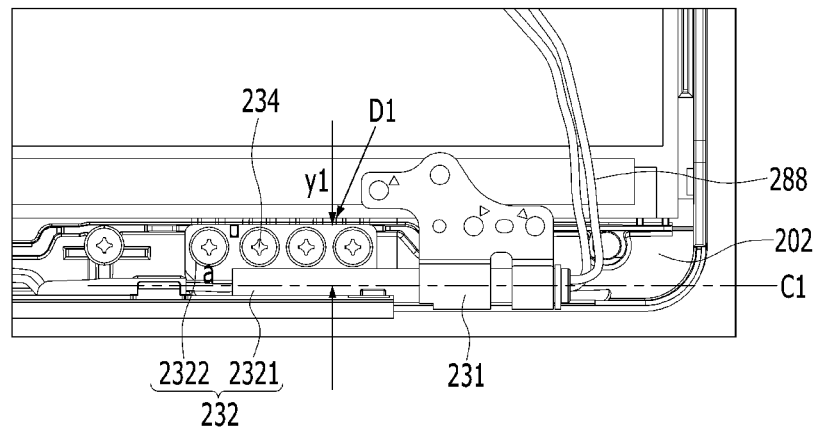
FIG. 14 is a view showing a hinge module coupled to a second body according to an embodiment of FIG. 9 and an embodiment of FIG. 11.
Figure 14:
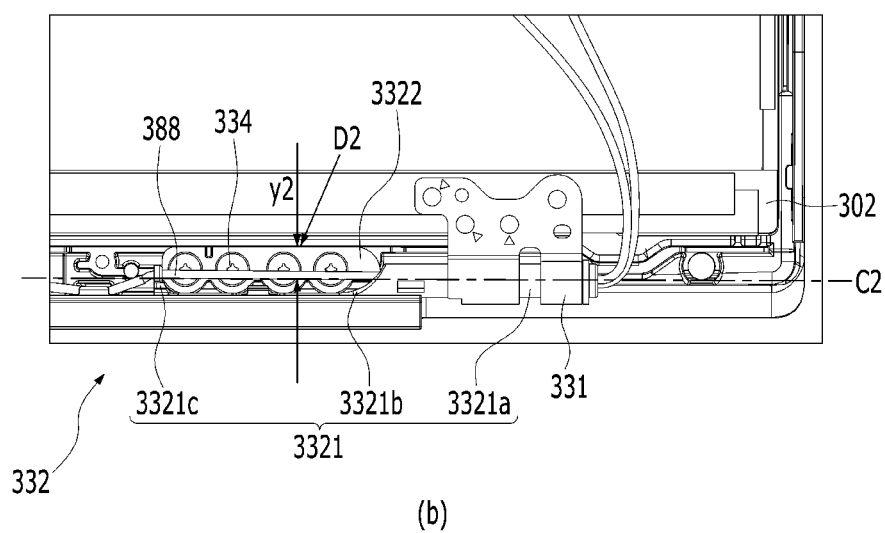

FIG. 14 is a view showing the hinge module 230 and 330 coupled to the second body 202 and 302 according to the embodiment of FIG. 9 and the embodiment of FIG. 11.

In an embodiment in which the connecting portion 2323 extends vertically, as shown in (a) in FIG. 14, the second fastening portion 2322 does not overlap the second shaft member 2321, so that screw 234 fastening is possible in a lateral direction of the second shaft member 2321.

As shown in (b) in FIG. 10, when the connecting portion 3323 is formed in the C shape, the second fastening portion 3322 overlaps the second shaft member 3321, so that the direct screw 334 fastening is not possible unlike in (a) in FIG. 14.

As a first method, there is a method of further extending the second fastening portion 2322 to a location that does not overlap the second shaft member 2321 as shown in (a) in FIG. 14.

As a second method, as shown in (b) in FIG. 14, the second shaft member 3321 may be cut to expose the second fastening portion 3322. Referring to (a) in FIG. 10, it may be seen that a second portion 3321b of the second shaft member 3321 is cut. This is to avoid overlapping of the second shaft member 3321 in a vertical direction of the second fastening portion 3322 to fasten the screw 334 to the second fastening portion 3322.

When the second portion 3321b of the second shaft member 3321 is eliminated, the second fastening portion 3322 may be exposed as shown in (b) in FIG. 14 and the screw may be fastened thereto, and a size of the second fastening portion 3322 does not need to be increased. As a result, a mounting space of the second body 302 may be secured, and an area size of the display 151 to be mounted may be increased.

However, the second portion 3321b of the second shaft member 3321 was cut and removed, so that an end of the second portion 3321b may include a third portion 3321c, which is a partially left portion of the second shaft member 3321, for rigidity and fixation of the hinge shaft 335.

As described above, according to at least one embodiment of the present disclosure, the gap between the pair of bodies may be reduced, so that the opening 3013c that is defined between the bodies, and especially, is the portion in which the hinge module 330 extends is not noticeable in the line of sight of the user.

In addition, because the size of the hinge module 330 may be reduced, the size of the portable electronic device 100 may be reduced.

In addition, because an area size for mounting the display 151 may be secured, a larger screen may be mounted.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A portable electronic device comprising:
a first body, the first body including an opening in a side surface in a first direction thereof;
a hinge device including a first bracket fixed to the first body and a second bracket coupled to be pivotable about a hinge shaft; and
a second body, the second body having one end inserted into the opening in the side surface of the first body,
wherein the second body is coupled to the second bracket of the hinge device,
wherein the hinge shaft is located inside the first body and extends in a second direction perpendicular to the first direction,
wherein an upper end of the opening in the side surface of the first body is more biased in the first direction than the hinge shaft of the hinge device.

2. The portable electronic device of claim 1, wherein the side surface of the first body includes:
an upper side surface that is bent at an end of a top surface of the first body; and
a lower side surface that is bent from the upper side surface toward a bottom surface of the first body, wherein a boundary between the top surface and the upper side surface is aligned with the upper end of the opening of the first body.

3. The portable electronic device of claim 2, wherein the first bracket includes:
   a cylindrical first shaft member constituting the hinge shaft; and
   a first fastening portion extending from the first shaft member and fastened to the first body with a screw,
   wherein the second bracket includes:
      a second shaft member inserted into the first shaft member;
      a second fastening portion fastened to the second body with a screw; and
      a connecting portion extending outwardly from the second shaft member and connected to the second fastening portion,
   wherein the connecting portion includes a curved surface or a bent portion to have a C-shape.

4. The portable electronic device of claim 3, wherein the second shaft member includes:
   a first portion overlapping the first shaft member; and
   a second portion where the connecting portion extends,
   wherein the first portion and the second portion are disposed side by side in the second direction.

5. The portable electronic device of claim 4, wherein an insertion direction of the screw inserted into the second fastening portion overlaps the hinge shaft.

6. The portable electronic device of claim 4,
   wherein the first portion of the second shaft member is a cylindrical member,
   wherein the second portion of the second shaft member is a plate-shaped member extending from one side of the first portion.

7. The portable electronic device of claim 6, wherein the second shaft member further includes a cylindrical third portion located at an end of the second portion.

8. The portable electronic device of claim 3, wherein the first fastening portion and the second fastening portion are disposed in parallel with each other when the first body overlaps the second body.

9. The portable electronic device of claim 2, wherein an angle between the top surface and the upper side surface is equal to or smaller than 120°.

10. The portable electronic device of claim 2, wherein a horizontal distance from a first boundary between the top surface and the upper side surface to a second boundary between the upper side surface and the lower side surface is equal to or smaller than 3 mm.

11. The portable electronic device of claim 1,
    wherein the first body is equipped with a keyboard,
    wherein the second body is equipped with a display.

12. The portable electronic device of claim 1, wherein a thickness of the second body is smaller than a thickness of the first body.

* * * * *